United States Patent

Sims

[15] 3,670,408

[45] June 20, 1972

[54] METHOD OF MAINTAINING A LAMINATED ARTICLE UNDER COMPRESSION DURING A PART OF ITS MANUFACTURE

[72] Inventor: Marion W. Sims, Fort Wayne, Ind.

[73] Assignee: General Electric Company

[22] Filed: July 2, 1970

[21] Appl. No.: 51,759

Related U.S. Application Data

[62] Division of Ser. No. 802,934, Feb. 27, 1969, Pat. No. 3,616,056.

[52] U.S. Cl. ...........................................................29/602
[51] Int. Cl. .....................B29f 5/00, H01f 7/06, B25b 11/00
[58] Field of Search ................269/8; 29/559, 602; 335/289, 335/295; 219/6.5, 10.41, 10.43

[56] References Cited

FOREIGN PATENTS OR APPLICATIONS

240,450 11/1911 Germany ...............................335/294

Primary Examiner—Robert L. Spicer, Jr.
Attorney—John M. Stoudt, Radford M. Reams, Ralph E. Krisher, Jr., Oscar B. Waddell, Joseph B. Forman and Frank L. Neuhauser

[57] ABSTRACT

Method for magnetically clamping together selected regions of a laminated article during at least part of its manufacture, especially effective in the manufacture of magnetic cores for use in inductive devices. A predetermined magnetic field is applied to the article or established in such a way that selected regions, such as extremities which tend to flare apart, are magnetically clamped. Under certain circumstances, the magnetic field may also be used to inductively heat the selected regions of the laminated article, for example, when heat-hardenable bonding material in unhardened form is disposed between adjacent laminations in the vicinity of the regions for hardening the bonding material.

9 Claims, 13 Drawing Figures

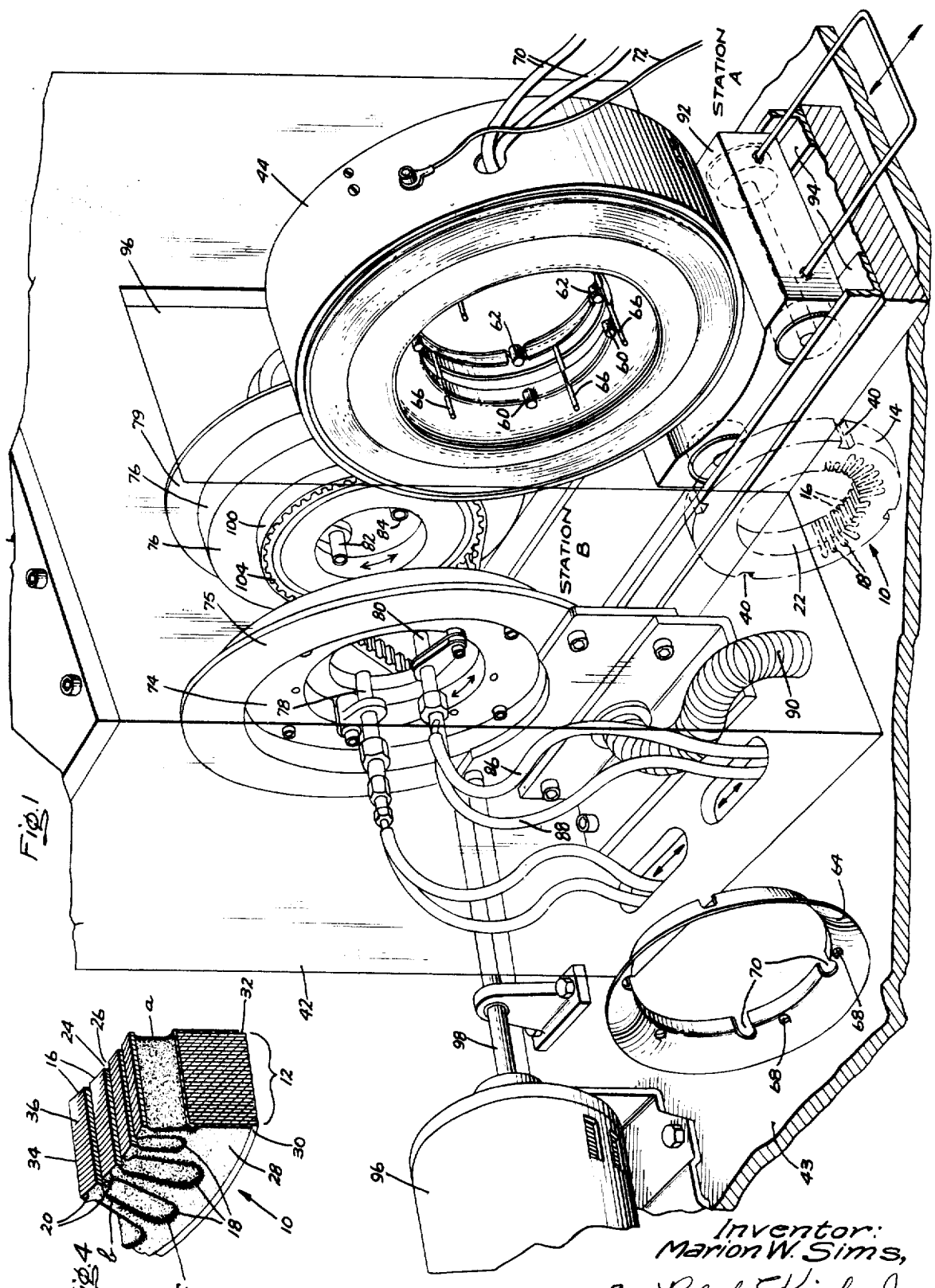

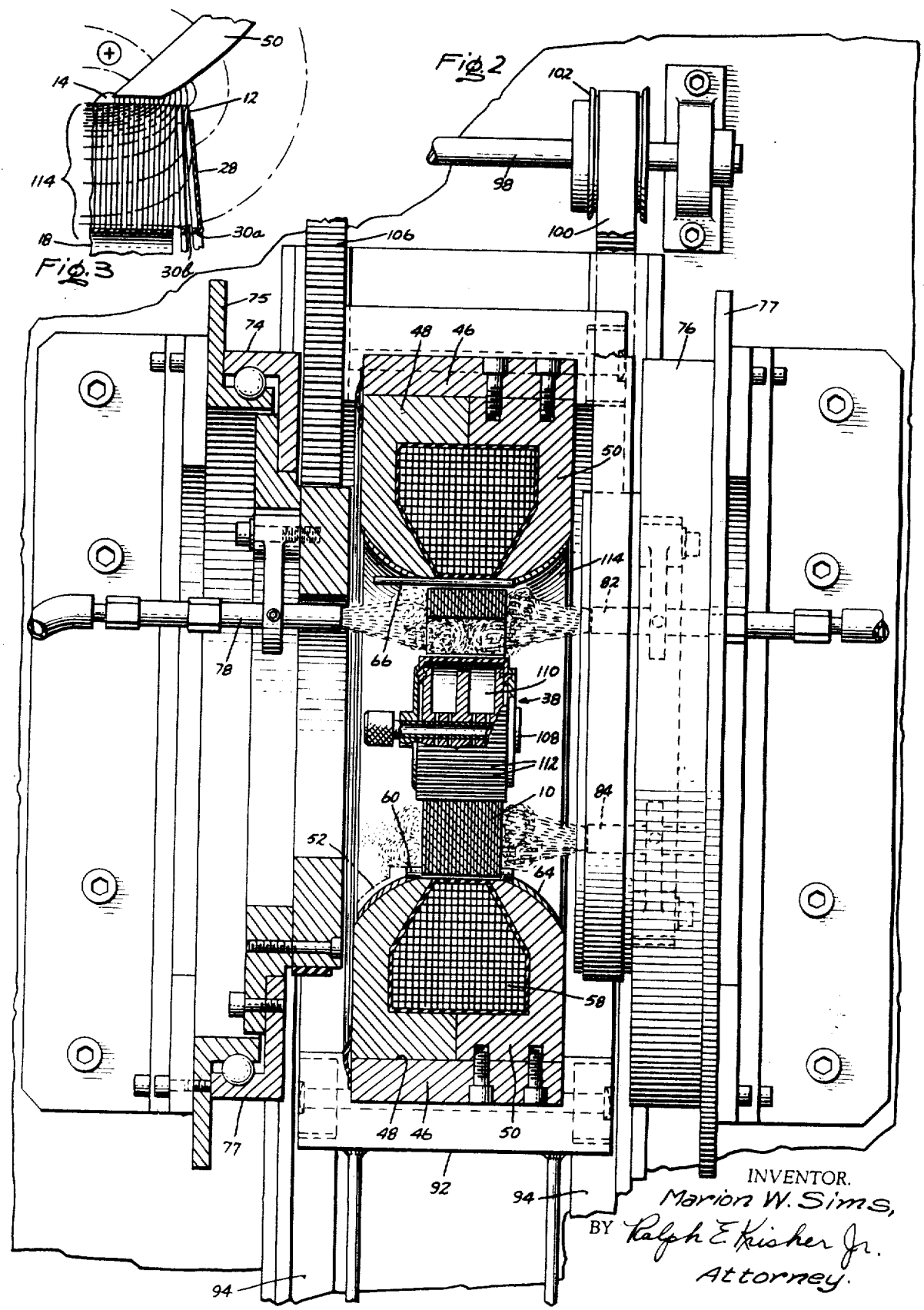

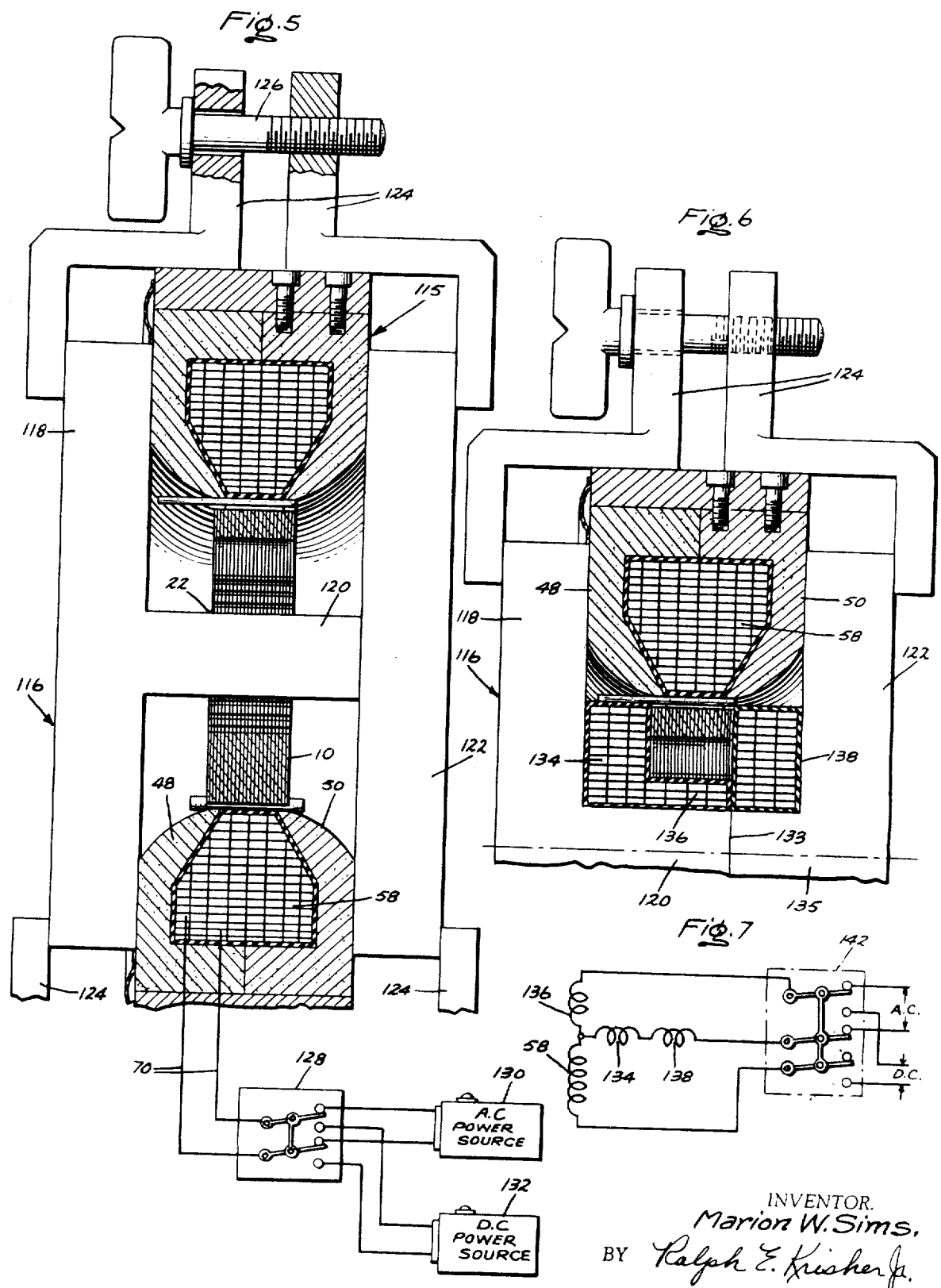

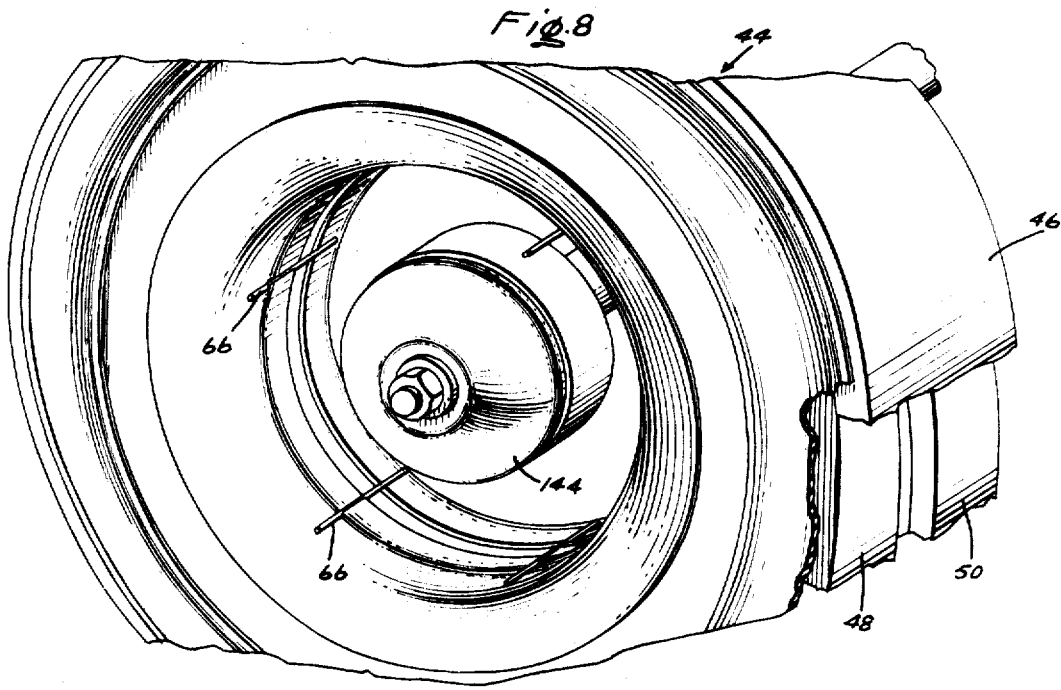
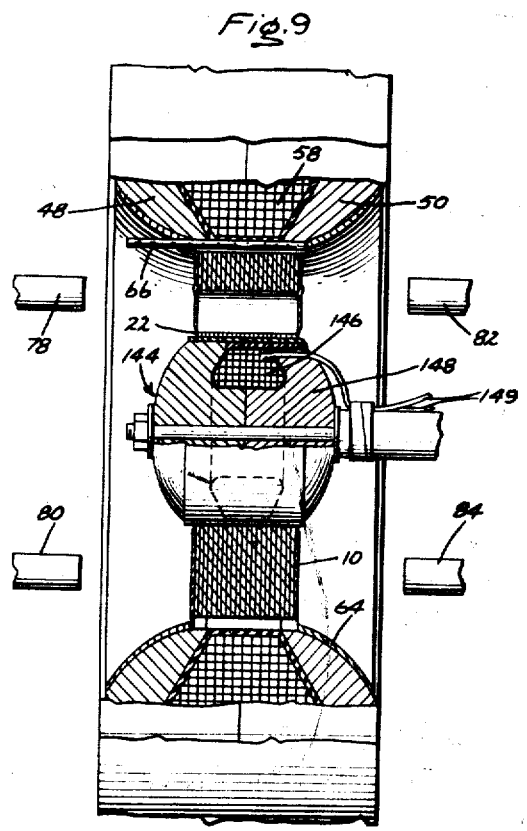
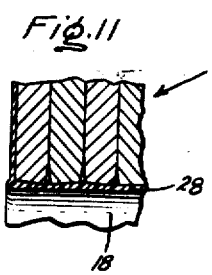
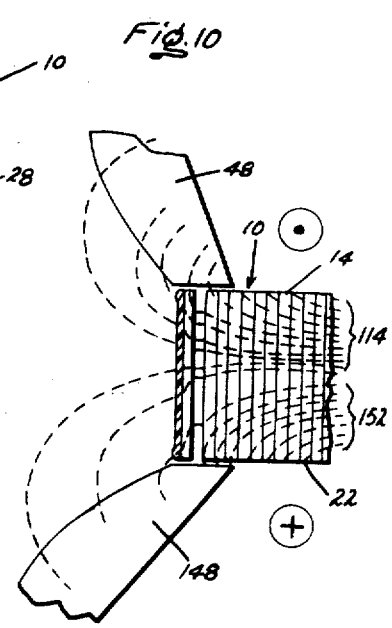

PATENTED JUN 20 1972 3,670,408

INVENTOR.
Marion W. Sims,
BY Ralph E. Krisher Jr.
Attorney.

3,670,408

METHOD OF MAINTAINING A LAMINATED ARTICLE UNDER COMPRESSION DURING A PART OF ITS MANUFACTURE

CROSS-REFERENCE TO RELATED APPLICATION

This is a division of my co-pending U. S. application Ser. No. 802,934 filed Feb. 27, 1969 which issued as U.S. Pat. No. 3,616,056 on Oct. 26, 1971.

BACKGROUND OF THE INVENTION

This invention relates to improved methods for maintaining certain regions of the article under compression during its manufacture when it is formed of magnetic laminations. In particular, the invention pertains to such improved methods especially effective in the manufacture of laminated magnetic cores for use in inductive devices.

In the manufacture of a laminated article and especially laminated cores fabricated from a stack of laminations stamped out of magnetic sheet material, a common and troublesome problem results from lamination deformation or distortion. In studying the problem, I have determined that one cause of distortion originates from the punching operation which has a tendency to produce a slight elongation and deformation of the cut edges of the lamination, as well as sharp burrs. Another source may be due to the complex configuration of the lamination which may include structurally weak sections, for instance, the long and narrow tooth sections of a stator core.

Taking the laminated stator core by way of illustration, the lamination distortions have a tendency to spread at least the outer laminations in the stack, particularly at the tooth sections near their extremities. Such distortions in turn adversely affect the quality of the manufactured core and may be of sufficient magnitude to prevent the manufacture of a satisfactory product.

SUMMARY OF THE INVENTION

It is therefore an object of the invention to provide improved methods for maintaining under compression certain regions of a laminated article formed of magnetic material during at least a part of its manufacture.

It is another object of the invention to provide improved methods which overcome at least some of the difficulties mentioned above, are relatively inexpensive to practice, and yet produce improved results in an effective and efficient manner.

It is another object of the present invention to provide an improved process for inductively heating an article during a part of its manufacture where preselected regions hereof have been drawn together by a magnetic field.

It is yet another object to provide an improved method of magnetically compressing preselected regions of an article of manufacture and to inductively heat those regions.

In carrying out the objects in one form, I provide improved methods for maintaining certain regions of a laminated article of manufacture, for instance a laminated magnetic core formed of magnetic elements, under compression during at least a part of its manufacture For instance, in connection with the manufacture of an unbonded dynamoelectric machine stator core, a magnetic field may be established by an electromagnetic device, such that magnetic clamping is achieved which is particularly effective in compressing together or holding certain extremities or peripheral regions (e.g., tooth sections) of adjacent laminations firmly together.

To achieve the magnetic clamping action, the electromagnetic device and the magnetic elements are positioned in a predetermined adjacent relation, and the elements are magnetically clamped together by energizing the electromagnetic device which produces the desired magnetic field of sufficient intensity to hold the elements under compression in stacked relation.

This holding action reduces the size of openings which might otherwise exist between adjacent laminations at such extremities and decreases the tendency of the core to lose heat at those locations for those applications where the rate of heat loss is important.

By proper construction it is also possible to employ the same electromagnetic device which produces the magnetic field to heat, by induction, the selected regions of the laminated article for one reason or another, e.g., to harden interlaminate bonding material when the laminated article includes such material.

The subject matter which I regard as my invention is particularly pointed out and distinctly claimed in the concluding portion of this specification. My invention itself, however, both as to its organization and method of operation, together with further objects and advantages thereof, may best be understood by reference to the following description taken in conjunction with the accompanying drawings.

BRIEF DESCRIPTION OF THE DRAWINGS

FIG. 1 is a view, in perspective, of apparatus which is capable of practicing one form of the inventive method as applied to the formation of a protective coating on selected, exposed surfaces of a laminated dynamoelectric machine stator core, the article of manufacture in the illustrated exemplification, the view showing the apparatus before the protective coating has been formed;

FIG. 2 is a horizontal cross-sectional view of certain principal parts of the apparatus shown in FIG. 1, revealing the way in which the coating is formed in a coating-forming station on certain exposed surfaces of the laminated core in the exemplification, FIG. 3 is an enlarged fragmentary view, partly in schematic form, showing the type of flux and force interaction which occurs between a part of the electromagnetic device of the apparatus shown in FIG. 2 and the laminated core of the exemplification, when the electromagnetic device creates a magnetic field in the vicinity of the core;

FIG. 4 is a fragmentary view, in perspective, of a portion of the laminated core coated in accordance with the improved apparatus and method illustrated in FIGS. 1 and 2;

FIG. 5 is a cross-sectional view of an arrangement partially in schematic form, for heating the core of the exemplification prior to formation of the desired coating on selected portions of the core, with part of the arrangement being used during the subsequent coating formation;

FIG. 6 is a partial cross-sectional view of a modified form of the arrangement shown in FIG. 5;

FIG. 7 is a schematic circuit diagram of the apparatus of FIG. 6;

FIG. 8 is a view, in perspective, of a modified form of the electromagnetic device, illustrated in FIGS. 1-3 inclusive, which may be employed in the practice of the inventive methods;

FIG. 9 is a cross-sectional view, partially broken away, of the modified electromagnetic device shown in FIG. 8, with the core of the exemplification being maintained in the coating station;

FIG. 10 is an enlarged fragmentary view, partially in schematic form, of the electromagnetic device and laminated core shown in FIG. 9 to reveal the type of flux and force interaction which occurs between the device and core when the device of this embodiment is excited;

FIG. 11 is an enlarged fragmentary view of a part of the core illustrated in FIG. 9 to show details of the protective coating formed thereon;

DESCRIPTION OF THE PREFERRED EMBODIMENTS

Figure 12:
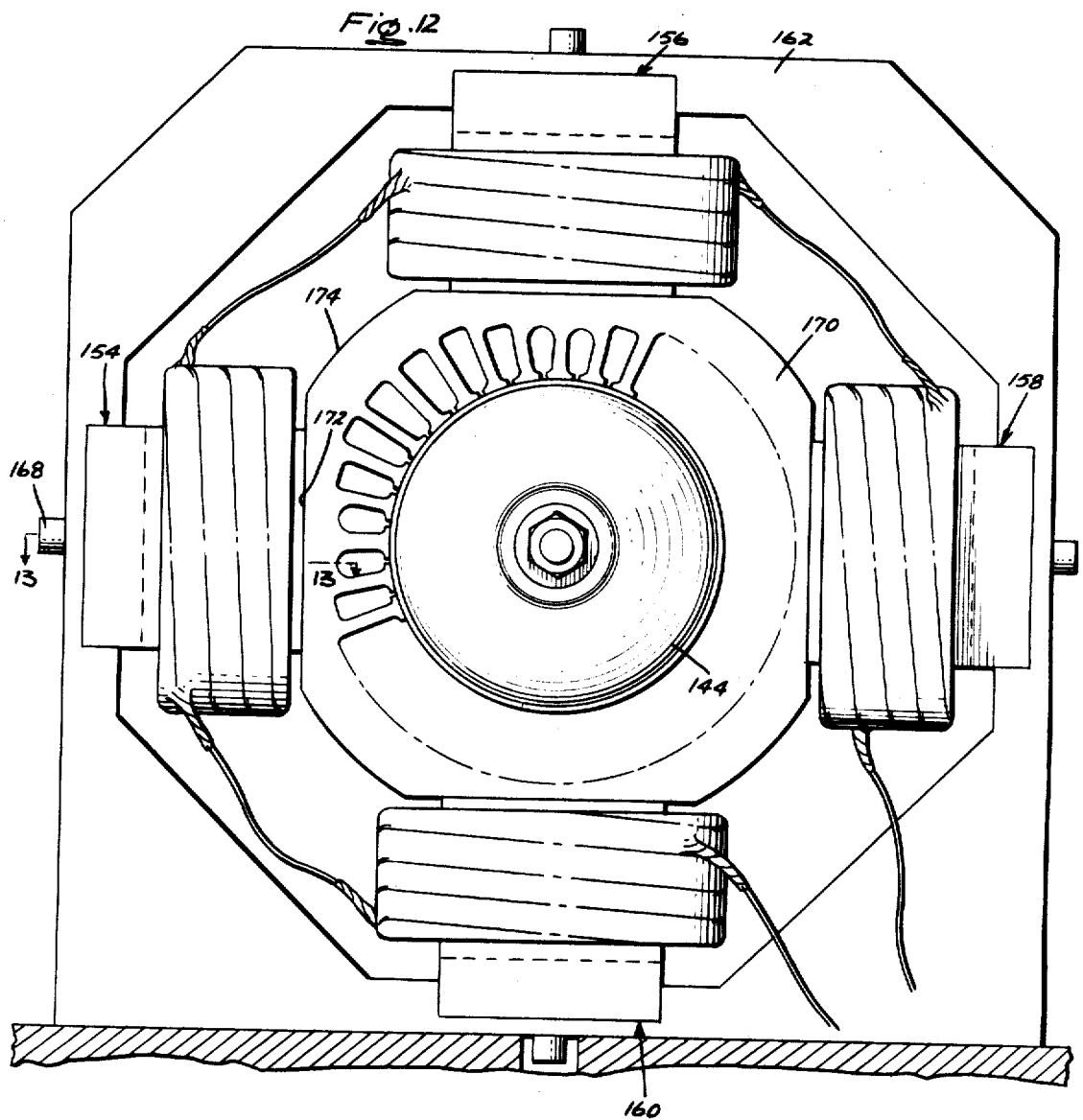
FIG. 12 is an end view of another modified form of apparatus which may be utilized in the practice of the inventive methods in connection with the stator core of the exemplification.

For the purpose of disclosing certain principles of the invention, FIGS. 1–4 illustrate one form of the invention in connection with the manufacture of a laminated article in the form of a stator core 10. As shown, the core is of the unbonded type having the configuration more fully revealed in the U.S. patent of A. A. Brammerlo, U.S. Pat. No. 3,235,762, issued Feb. 15, 1966.

Core 10 comprises a stack of superimposed, identical laminations 12 stamped out of magnetic material, such as common electrical grade iron, into a desired configuration. Core 10 includes an annular yoke section 14 and angularly spaced apart tooth sections 16 which define coil-accommodating passageways in the form of slots 18. The tooth sections terminate at their free ends in enlarged lips 20, which together form an axial bore 22 adapted to receive a rotor (not shown). Opposed entrance surfaces 24 and 26 of adjacent tooth section lips define restricted slot entrances communicating between the bore and slots in the usual way.

FIG. 4 illustrates a section of core 10 having the protective integral insulating coating 28 already formed thereon. Note that the coating is formed on the outer surfaces of outer laminations 30 and 32 and the interior of the slots 18. However, the bore faces 34 and slot edges 36 of the tooth sections 16 are essentially free of integral insulating material.

Integrally insulated cores in which the slots and outer surfaces are insulated by a continuous film offer cost and performance advantages. However, making a good integrally insulated core, especially of the unbonded type, requires that the core laminations be held tightly together. Conventionally, laminations in such cores have been held together in stacked relation by welds or other mechanical securing arrangements like metal keys forced into the slots 40 formed in the yoke 14 of core 10. Even though it is desirable to clamp the outside or yoke of the core to compress the laminations in stacked relation clamping this area offers little support to the slender and mechanically weak tooth sections 16. Consequently, there is a tendency for the lamination teeth to flare at their tips, as illustrated in FIG. 3. The flaring generally occurs in the outer laminations of the tooth sections, such as the outer lamination 30a of FIG. 3. Other laminations may also exhibit some flaring.

Even though the tips of the tooth sections could be held in place by mechanical clamps, any physical contact of a clamping fixture with the tooth laminations might interfere with the application of the integral insulation, for example by the powder-spraying apparatus illustrated in FIGS. 1 and 2. This problem is solved in the present invention by applying a magnetic field to the core in such a way that the ends of the tooth sections are drawn or otherwise held firmly together during the application of a powder which forms the integral insulation, thereby tending to eliminate the irregularities in the insulation which occurred in the prior art due to the flaring of the tips of the tooth sections, especially were the laminations not coated, for example, with shellac.

Magnetic clamping of the laminations is particularly advantageous when the integral insulation is formed by the application to the cores of a material, such as a powdered resin, containing magnetic particles, such as 2 per cent of a magnetic oxide pigment. The use of magnetic particles in the material which forms the integral insulation is fully described and claimed in Avila U.S. Pat. No. 3,136,650. As explained in that patent, the application to the core of a magnetic field, after the resin applied to the core has melted or fused, causes an increased thickness of the coating to occur at the edges of the slots, such as edges $a$, $b$ and $c$, illustrated in FIG. 4. Prior to the Avila invention, surface tension caused the coating to pull away from the slot edges so that the coating on the edges was thinner than on the other areas of the core when it is desirable to have on the edges a coating thickness at least as great as the thickness of the coating on other surfaces because of the increased wear at these edges. Of course, the magnetic field can be controlled so that the coating material builds up on the edges to a controlled thickness, slightly less than, the same as, or greater than that formed on the flat surfaces of the core, the thickness being greater by this approach than would otherwise occur along the edges.

FIGS. 1 and 2 illustrate a preferred embodiment of particularly effective apparatus capable of practicing one form of the method. The apparatus has an electromagnetic device for magnetically clamping the tips of the tooth sections of a preheated laminated core 10, while a protective integral insulation coating is being applied to the core by means of powder-spraying nozzles. FIG. 1 illustrates core 10 at station A where the core is loaded into the assembly 44, and FIG. 2 illustrates the core at station B where the coating-forming material is applied to the core.

The general organization of the apparatus is illustrated in FIG. 1 and includes a housing 42 mounted on a platform 43. The core 10 is adapted to be mounted within a doughnut-shaped electromagnetic clamping assembly or device 44. As illustrated in FIG. 2, the electromagnetic clamping assembly 44 includes an annular iron yoke 46 enclosing two annular pole pieces 48 and 50. As indicated by the dotted line 52, the pole piece 48 is movable to the left to permit assembly 44 to be opened when a core 10 is to be inserted therein. The pole pieces enclose an annular winding 58 which together with the pole pieces produces the magnetic field used for clamping of the laminations at the tips of tooth sections 16, and for other functions, as will be described in more detail below.

Core 10 is inserted in the electromagnetic assembly 44 by opening the assembly and aligning the slots 40 with sets of lugs 60 and 62 fixed to pole pieces 48 and 50, respectively. After the core is inserted in assembly 44, it is rotated until the lugs and slots 40 are no longer in alignment, and the assembly is then closed by energizing coil 58 so that the lugs apply mechanical clamping pressure to the yoke or outer peripheral edges of the laminations 12 forming the core 10. A powder deflector 64 is then inserted in each side of assembly 44 by aligning pins 66 fixed to the assembly with corresponding apertures 68 formed in the deflector 64. The pins 66 also function to space the core 10 from the pole pieces 48 and 50 to minimize the flow of heat from the preheated core to the iron mass of the electromagnetic elements 46, 48, and 50.

Deflector 64 also contains recesses 70 corresponding to the lugs 60, whereby the deflector may be inserted sufficiently far into the assembly so that it functions to prevent insulation powder from entering the space between the outer diameter of core 10 and the inside diameter of pole pieces 48 and 50. The magnet is closed by energizing the coil 58 so that pole pieces 48 and 50 are brought firmly together. The coil is suitably energized by applying DC or AC voltage across the leads 70 which are connected to coil 58. The electromagnetic assembly 44 is grounded by connecting a ground lead 72 to a suitable ground.

The illustrated coating apparatus also includes a suitable arrangement for applying the protective coating material in powder form. By way of example the apparatus includes a pair of slewing rings 74 and 76 upon which are mounted four spray nozzles 78, 80, 82 and 84 having the same general construction more fully disclosed in U.S. Pat. Nos. 3,355,309 and 3,355,310. In general, however, each nozzle is connected via a pair of hoses to a source of compressed air and also to a source of powdered material, such as thermosetting epoxy resin, which may contain magnetic particles, and which will form an adherent, protective integral insulating layer on preselected surfaces of the core which have been preheated to a predetermined temperature. Generally speaking, such a material melts, flows slightly, and coalesces or fuses onto the core surfaces with the proper adhesion in the temperature range of 190° and 232° C. As illustrated in FIG. 1, a nozzle 80 has a hose 86 connected to a source of compressed air and a hose 88 connected to a source of coating-forming powder. Excess powder is recovered by means of a vacuum applied to a hose 90 which returns the powder to the powder source.

The assembly 44 containing the preheated core 10 is mounted on a dolly 92 which moves from station A along a pair of tracks 94 to station B between the slewing rings 74 and 76. The dolly and assembly pass through a rectangular opening 96 formed in the housing 42.

Once the preheated core 10 is properly positioned between the slewing rings 74 and 76, as best illustrated in FIG. 2, coil 58 is suitably energized, for example, by direct current or alternating current to cause magnetic flux to flow through the core laminations 12 in such a manner that the tips of the tooth sections are compressed. The coil is energized by causing the current to flow through the leads 70 which are electrically connected in series with the coil 58. While the coil 58 is energized to clamp the laminations together, fusible insulating powder is sprayed by nozzles 78–84 through the slots 18 and upon the faces of the outer laminations 30 and 32. During each powder-applying cycle, the nozzles are rotated approximately 195° in one direction and then approximately 195° in the opposite direction. This oscillatory motion produces a more uniform coating on the core than is available with apparatus in which rotation is in one direction, because the oscillatory rotation permits the powder to impinge upon the core surfaces from two different directions. Furthermore, in the illustrated embodiment, the oscillatory motion prevents the hoses attached to the nozzles from becoming entangled with each other.

The oscillatory rotation is illustrated as being produced by a reversible electric motor 96 mounted on bed 44, but the rotation could also be produced by a unidirectional motor coupled to a motion converter whose output is oscillatory. Motor 96 rotates a shaft 98, to which is fixed two pulleys, each of which drives one of the slewing rings through a corresponding notched belt. The pulley for driving ring 74 is not shown in the drawings. However, slewing ring 76 is driven by means of a notched belt 100 which passes along a pulley 102 and a notched ring 104 fixed to the slewing ring 76. A notched belt 106 drives slewing ring 74 in a similar manner. Slewing ring 74 is rotatably mounted in a fixed frame 75 by ball bearings 77, and ring 76 is similarly mounted in a fixed frame 79.

As will be discussed in more detail below, the powder may also contain magnetic particles in which case the coil 58 is energized by direct current so that the same magnetic field which clamps the laminations together will also draw the magnetic particles together with the melted resin to the edges $a$, $b$, and $c$ of the core, thereby forming an increased thickness of an integral insulating coating along these edges than would otherwise occur. Even though it is to be understood that the magnetic clamping feature of the invention may be used during the manufacture of articles other than in connection with the application of fusible resinous powder having magnetic particles, in the following discussion of the preferred embodiment as illustrated in FIGS. 1 and 2, it will be assumed that the integral insulation is formed by the application of a powdered, fusible resin containing particles of magnetic oxide of the type disclosed in the Avila U.S. Pat. No. 3,136,650.

Before the electromagnetic assembly 44 is positioned between the slewing rings 74 and 76, a mask assembly 38 may be inserted into the bore 22 of the core 10. One type of such assembly is more fully disclosed in the above mentioned U.S. Pat. No. 3,355,309. However, it is partially illustrated in FIG. 2. Generally, the mask consists of an inlet 108, a cavity 110 and a plurality of projections 112. The outer surface of the cavity engages the inside of the bore 22 and the projections project into the entrances 18 just beyond the flared tips 20 of the tooth sections 16 to prevent coating material build-up in the entrances and bore 22.

The magnetic field configuration generated by the electromagnet is illustrated in FIG. 4 relative to the pole piece 50 and the upper right-hand portion of core 10, as viewed in FIG. 2. The magnetic lines of flux are indicated by the dashed lines 114 in FIGS. 2 and 3.

One may think of magnetic forces on a piece of iron in air as arising from the entry of flux lines into, and the exit of flux lines out of, its surfaces. For practical purposes, it is believed correct to consider all flux lines as entering and emerging from the iron at right angles to its surface. Qualitatively, the phenomenon is as if the flux lines emanating from the iron were like rubber bands in tension. Lines entering or leaving the upper surface pull the iron up whereas lines entering or lowering a lower surface pull it down. The net force on a piece of iron in a magnetic field is the resultant of all the "tensions" on all its surfaces.

Quantitatively, the forces depend upon flux density at the surface. For iron surrounded by air, the "tensile pressure" on the surface is given by $F = 1.39B^2 10^{-8}$ pounds per square inch, where B is the flux density at the region in question in lines per square inch.

One method of obtaining the proper magnetic clamping force is to create a condition in which the number of flux lines crossing the tooth lamination surface facing the center of a tooth section is greater than that crossing the opposite surface. Such a field configuration will produce a net force which will pull the lamination toward the center of the stack. In an ideal field configuration, all the flux would enter at the edges of laminations (thereby producing neither flaring nor tightening forces), and leave from the surface at the center of a tooth section.

Another method of obtaining the desired magnetic clamping force is to direct the flux lines through a lamination so that the points of entry and exit of at least some lines are offset, i.e., the entry and exit points on the parallel surfaces of the lamination are not directly opposite each other. Such a field configuration produces a magnetic moment which forces the tooth tip portion of the lamination towards the center of the stack of laminations while producing a force which tends to flare the yoke portion of the lamination away from the stack. The magnetic clamping assembly 44, as illustrated in FIGS. 1, 2, and 3, produces a magnetic field configuration which employs both of these methods to obtain the desired magnetic force to clamp together the tips of the tooth sections of the core.

As illustrated in FIG. 3, the majority of the flux lines emanate from pole piece 50, enter the edges of the laminations 12 in a direction substantially parallel to the plane of the laminations, travel through the laminations toward the center of the tooth section, and then leave each lamination in a direction which is substantially perpendicular to the plane of the lamination whereby there is developed a resultant magnetic force tending to force the tip of lamination 30a to the left, thereby eliminating flaring of the lamination. Consequently, the tooth tips of all the laminations tend to be drawn to the center of the tooth section, that is, to the left in FIG. 3, thereby compressing the laminations to eliminate flaring. In other words, all of the flux which enters each lamination must exit in a direction substantially perpendicular to the left-hand surface of the lamination thereby causing a resultant moment which favors drawing the tip or lower portion of the lamination to the left. It is believed that the resultant favorable moment occurs due to a large number of flux lines that enter the edges of the laminations substantially parallel to the planes of the laminations but leave the laminations substantially perpendicular thereto. Due to the high flux density at the yoke end of lamination 30a, together with the shunting effect of the next adjacent lamination 30b, there is also a magnetic force which tends to pull the yoke end of lamination 30a to the right, that is, tends to flare the yoke end of lamination 30a. This flaring tendency can be quite high at large values of magnetic field intensity, but the lugs 60 and 62 fixed to the pole pieces of the electromagnet firmly clamp the yoke portion of the core so that flaring does not actually occur.

In an actual use of the invention, coil 58 had 350 turns, and the power source connected to the coil produced magnetic fields of up to 17,000 ampere turns. However, the intensity of the field required to pull the tooth tips together depends on how badly they are flared, the dimensions of the core, and the distance between the core and electromagnetic device, among the more important factors. Furthermore, the field required for holding the laminations together is less than that required for initially overcoming the flaring.

When magnetic oxide particles are included in the powder applied to the preheated core 10, the same unidirectional or DC magnetic field which provides the clamping of the tips of the tooth sections also draws the integral insulation-forming material toward the edges a, b, and c, as illustrated in FIG. 4, thereby causing an increased thickness of integral insulation to form along those edges than would otherwise be the situation. This magnetic drawing is accomplished by maintaining the electromagnet energized for a short time after the powder is applied to the core. It has been found that the application of the magnetic field during the spraying of the powder upon the core does not adversely affect the pattern of distribution of the powder; i.e., the powder is substantially uniformly distributed along the surfaces of the core slots. After the coating material has set or cured, for example, by further heating of a thermosetting material, the electromagnet is deenergized to remove the magnetic field, and the cured material which is now bonded to the lamination, will mechanically hold the laminations together.

FIG. 5 illustrates a variation of the embodiment illustrated in FIGS. 1 and 2, whereby an electromagnet device 115 can be used not only to magnetically clamp the core laminations and to draw an insulating coating containing magnetic particles toward the slot edges in order to provide an increased thickness of integral insulation about those edges, but also to inductively heat the core 10 both prior to the powder-spraying operation and also after the magnetic drawing operation, if such is desired. In FIG. 5, a T-shaped magnetic member 116 is positioned such that one leg 118 contacts the pole piece 48 of magnet 115 and another leg 120 extends completely through the bore 22 of core 10. Another magnetic member 122 is placed in contact with the pole piece 50 and with the leg 120. The magnetic members 116 and 120 are clamped in position by suitable clamps 124 and suitable fastening means such as the threaded fastener 126. The bore and slot edge masking assembly 38 is not used in the embodiment illustrated in FIG. 5. The magnetic elements 116 and 122 form closed magnetic paths with the electromagnet 115. These magnetic members, together with the electromagnet and core 10 define a transformer arrangement in which the coil 58 forms the primary winding of the transformer and the core 10 effectively forms a single turn short-circuited secondary winding. Coil 58 is electrically connected via leads 70 to a double pole, double throw switch 128. The switch may be operated to connect the coil either to a suitable source, such as an AC power source 130, to establish a varying magnetic field for inductive heating purposes or to a suitable source, such as a DC power source 132, to establish a unidirectional magnetic field.

Just prior to the loading of the electromagnet 115 containing core 10 into the spraying apparatus, i.e., at station A, switch 128 is placed in the condition illustrated in FIG. 5 to apply AC power to coil 58. The resulting AC current, for example 30 amperes at 140 Hertz establishes a varying magnetic field which inductively heats core 10 to place it in the preheated condition previously referred to. The resultant magnetic field produced by coil 58 also produces the magnetic tightening effect at the tips of the core tooth sections as previously described. When the core is preheated to the temperature at which the insulating powder will fuse and adhere to the core laminations, the powder is applied to the core. When the powder has melted, the switch 128 is operated to its other position to connect the DC power source 132 to the coil 58. The magnetic field resulting from the direct current flowing in coil 58 maintains the magnetic clamping effect at the tips of the tube sections and also draws the magnetic oxide-containing resin, which is now in a liquid state, toward the slot edges to provide an increased thickness of insulation coating thereon. After the coating has built up to a sufficient thickness along the slot edges (a matter of a few seconds) switch 128 is returned to the position illustrated in FIG. 5 so that AC power is applied to coil 58, thereby resulting again in inductive heating of core 10. The switch 128 is maintained in this position until the core has been heated to a sufficiently high temperature for a sufficiently long period of time to cure or set the magnetic oxide-containing resin, thereby bonding the magnetic oxide resin to the core to form an integral insulation on the core. Once the resin has set, the laminations are tightly bonded together by the coating, and therefore the core 10 may be removed from the fixture and the laminations will be held tightly together by the integral insulation as illustrated in FIG. 11.

FIGS. 6 and 7 illustrate another embodiment of the invention in which the core may be heated simultaneously while the laminations thereof are magnetically compressed.

The embodiment of FIG. 6 utilizes the same transformer action utilized in the embodiment of FIG. 5. However, the leg 120 of magnetic element 116 extends only as far as the line 133, and the magnetic element 122 includes a horizontal extension 135 which is adapted to abut the leg 120 and which also provides the core upon which to wind an annular coil 138. Leg 120 also carries an annular coil 134 and a bore coil 136. The function of these various coils will be described in connection with the circuit diagram of FIG. 7. When it is desired to inductively heat and magnetically clamp the core laminations together, a switch 142 is in the position illustrated in FIG. 7 and connects coils 136, 134 and 138 in series across a source of AC power. In this embodiment, the coil 58 contains 323 turns instead of 350 turns used in the previous embodiments and is not used in the inductive heating step. When the core has reached the temperature suitable for the application of the magnetic oxide-containing resin powder, switch 142 is moved to its alternate position to connect coils 136 and 58 in series across a DC power supply to maintain the laminations magnetically compressed and also to draw the magnetic resin to the slot edges of the core to assure that a protective coating of sufficient thickness is formed at these edges. In order to obtain a greater inductive heating effect, the circuits of FIG. 7 could be modified so that coil 58 is also energized by the AC power during the heating step.

FIGS. 8–10 illustrate another embodiment of the invention which reduces the tendency of the laminations to flare along the yoke of core 10. In this embodiment, an electromagnetic device 144 is inserted in the bore 22 of core 10. The device consists of an annular coil 146 wound on a magnetic core 148. Coil 146 is adapted to be connected via lead 149 to the same DC source which energizes the coil 58. The magnetic field 152 generated by coil 146 produces a force which opposes the force produced by the field from coil 58. Even though the resultant force is in a direction that would tend to flare the tips of the teeth along the bore 22, this force is not great enough to cause the tips of the tooth sections to flare. In effect, the center of the magnetic force is moved to the center of the lamination, and the stiffness of the lamination is sufficient to keep the ends of the lamination from flaring up. Consequently, the addition of the electromagnetic device 144 produces a resultant clamping force which is more uniformly distributed over the lamination surface while eliminating flaring at both the yoke and tooth tips.

FIG. 11 illustrates the manner in which the integral insulating coating 28 covers the edges of the slot with an increased thickness of coating and also fills in small spaces, if any, that might exist between the laminations of the core along the slot walls.

Figure 13:
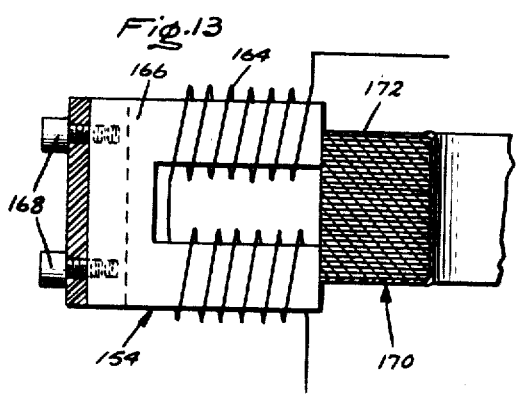
FIG. 13 is a cross-sectional view of one magnetic pole of the electromagnetic device shown in FIG. 12, the view being taken along line 13—13 in FIG. 12.

FIGS. 12 and 13 illustrate another embodiment of the invention. Four electromagnetic assemblies 154, 156, 158, and 160 are mounted in a frame 162. As illustrated in FIG. 13, each electromagnetic assembly, such as assembly 154, consists of a coil 164 wound on the legs of a U-shaped magnetic core 166 secured to frame 162 by means of bolts 168. A laminated stator core 170 is positioned in the center of frame 162. The yoke 174 of the core has four equally spaced flat portions, each of which engages the ends of the legs of a different one of the U-shaped magnetic cores. For example, the flattened portion 172 engages the ends of the legs of the U-shaped core 166 of electromagnet assembly 154. The electromagnetic device 144 is inserted in the bore of a core 170.

In operation, core 170 is preheated and placed in the frame 162. The coils of the electromagnetic assembly are connected in series with each other and with the electromagnet device 144 to produce in core 170 the general flux configuration as illustrated in FIG. 10 for tightening the tips of the tooth sections of the core. Furthermore, if the coating material applied to the core contains magnetic particles, the magnetic field draws the coating material towards the slot edges of the core so that the coating builds up to a thickness which is greater than that which would occur if magnetic powder and a magnetic field were not used. The arrangement illustrated in FIGS. 12 and 13 also reduces the flaring of the laminations at the yoke 172 of core 170. To accomplish this result, the cores are mounted in such a manner that some slight radial movement is permitted so that when the magnetic coils are energized, the U-shaped cores are magnetically attracted to the yoke of core 170 to firmly engage the yoke so that the resulting friction restricts flaring of the core laminations at the yoke.

It will be appreciated from the foregoing disclosure that the methods and apparatus of the present invention, among other advantages, may be rapidly, efficiently and easily practiced to manufacture articles of improved quality. Moreover, the methods are quite versatile in nature. In regard to this latter feature, the electromagnetic devices described above (see FIG. 7, for instance) may be quite effectively employed to produce laminated cores having interlaminate bonds. For example, with the laminations disposed in stacked relation and adherent bonding material in unhardened form between adjacent laminations, the devices may be excited to generate the requisite magnetic field for firmly holding together the laminations in stacked relation until the interlaminate bonding material has become sufficiently hardened. Where the interlaminate bonding material is of the thermo-responsive, heat-hardenable type (as compared with a pressure-sensitive material), if desired, the same electromagnetic devices may also be used to inductively heat the laminated stack to the proper temperature in the manner already explained to produce sufficient heat for hardening the material. Bonded cores having such material are more fully disclosed in the DeJean et al. U.S. Pat. No. 3,293,471 and the Hull U.S. Pat. No. 3,299,304.

Thus, while in accordance with the Patent Statutes, I have described what at present is considered to be the preferred embodiments of my invention, it will be obvious to those skilled in the art that numerous changes and modifications may be made therein without departing from the invention, and it is therefore intended in the appended claims to cover all such equivalent variations as fall within the true spirit and scope of the invention.

What I claim as new and desire to secure by Letters Patent of the United States is:

1. A method of firmly holding together magnetic laminations in a preselected portion of a laminated structure comprising the steps of generating a magnetic field having lines of flux; and directing the lines of flux through at least one of the laminations so that some of the lines enter and leave opposite parallel surfaces of the at least one lamination at points on the surfaces which are not opposite each other, thereby creating a magnetic moment which clamps at least one lamination to the remainder of the laminated structure in the preselected portion.

2. The method of firmly holding together magnetic laminations in the tip of a tooth section of a laminated stator core having an outer yoke section and inner tooth sections defining a bore, the method comprising the steps of generating a magnetic field having lines of flux; directing the lines of flux through at least one of the laminations in a direction to produce resultant magnetic forces which clamp at least one of the laminations in the tip of a tooth section to other parts of the laminated stator core; and mechanically clamping together the laminations in the yoke section as the tip of the tooth section is being clamped to other parts of the laminated stator core.

3. The method as defined in claim 2 wherein a portion of the lines of flux are directed along a substantially parallel path segment and enter the laminated stator core via the yoke section and another portion of said lines of flux enter said laminated stator core via the tip of said tooth section.

4. A method of maintaining an article having magnetic elements under compression during a part of manufacture thereof comprising the steps of: positioning a first electromagnetic device and the article in a predetermined adjacent relation with respect to one another, and magnetically compressing preselected regions of the magnetic elements together by energizing the first electromagnetic device and establishing a predetermined magnetic field of sufficient intensity to apply a compressive force to the magnetic elements during the manufacture of the article thereby drawing the preselected regions together.

5. The method of claim 4 including the step of inductively heating the magnetic elements by exciting the first electromagnetic device to produce a magnetic field and effecting an increase in temperature of the magnetic elements.

6. The method of claim 4 in which the magnetic elements have unhardened bonding material disposed between adjacent elements, and the method includes the further step of generating a magnetic field, by energizing the first electromagnetic device, of sufficient intensity to place the magnetic elements under compression until the bonding material hardens.

7. The method of claim 6 in which the bonding material is of the thermo-responsive, heat-hardenable type and wherein the further step includes inductively heating the magnetic elements by exciting the first electromagnetic device to effect a magnetic field for increasing the temperature of the magnetic elements thereby applying heat to the bonding material before it becomes hardened.

8. The method of claim 4 in which the article is a laminated stator core having a yoke section and tooth sections formed with tips defining a bore and wherein positioning the first electromagnetic device and article includes placing the first electromagnetic device outwardly and in the vicinity of the stator core; and the method includes maintaining the laminated stator core and the first electromagnetic device in that position while magnetically clamping tooth section tips together.

9. The method of claim 8 further comprising positioning a second electromagnetic device adjacent the bore of the laminated stator core, concurrently energizing the first and second electromagnetic devices to establish magnetic fields, and magnetically compressing the yoke section and tooth section tips to draw the respective regions together.

* * * * *